Patented Oct. 30, 1945

2,387,833

UNITED STATES PATENT OFFICE 2,387,833

POLYMERIC ACETALS AND PROCESS OF MAKING SAME

Joseph Dahle, West Newton, Mass., assignor, by mesne assignments, to Pro-phy-lac-tic Brush Company, Northampton, Mass., a corporation of Delaware No Drawing. Application October 30, 1942, Serial No. 463,943

6 Claims. (Cl. 260—73)

In a previous application of Joseph Dahle, Serial No. 388,143, filed April 11, 1941, now United States Patent No. 2,360,477, there is described a new method of treating hydroxylic base materials, such as polyvinyl alcohol, to render them water resistant or water insoluble, the procedure being essentially topochemical since the base material does not go into solution during the reaction.

The present invention is based upon the discovery that a rapid and very effective insolubilization is produced by the action of an aldehyde dissolved in an organic liquid which is a non-solvent for the polyvinyl alcohol and the reaction product but probably at least a partial solvent for the reactive agent, e. g. an aldehyde. A liquid hydrocarbon is suitable for the purpose. I may prefer to pretreat the base material with a catalyst, such as sulfuric acid, dissolved in a liquid, such as methanol, which is a non-solvent for the base material and non-reactive therewith. This is particularly desirable when the catalyst tends to produce a discoloration of the aldehyde when added directly to the aldehyde solution. Otherwise, the catalyst may be added to the aldehyde solution. Sometimes, the addition of an auxiliary liquid, such as acetic acid, may be used to increase the reaction rate or the degree of reaction or both.

The invention will be further illustrated by the following specific examples.

Example No. 1

A sheeting was made by casting a film from a polyvinyl alcohol solution containing aqueous formaldehyde and ammonium sulphate. The residual alcohol groups in the sheeting were 63–64% calculated as vinyl alcohol. This sheeting was comminuted and two samples of 10 grams each were refluxed on a water bath for four hours in similar non-solvent reaction baths of toluol containing varying acetic acid concentrations as shown in the following table. After the reaction the samples were purified and the residual alcohol groups determined calculated as vinyl alcohol.

| No. | Composition of reaction mixture | Parts by weight | Residual alcohol groups |
|---|---|---|---|
| 1 | Toluol | 100 | 18.9 |
|  | Paraform | 20 |  |
|  | Acetic acid | 25 |  |
|  | Ammonium sulfate | 4.4 |  |
| 2 | Toluol | 100 | 11.1 |
|  | Paraform | 20 |  |
|  | Acetic acid | 50 |  |
|  | Ammonium sulfate | 5.1 |  |
| 3 | Toluol | 100 | 9.2 |
|  | Paraform | 20 |  |
|  | Acetic acid | 75 |  |
|  | Ammonium sulfate | 5.9 |  |
| 4 | Toluol | 100 | 8.2 |
|  | Paraform | 20 |  |
|  | Acetic acid | 100 |  |
|  | Ammonium sulfate | 6.8 |  |

Example No. 2

A 10-gram sample of comminuted polyvinyl alcohol sheeting same as used in the preceding example was refluxed on a water bath for 4 hours in a reaction mixture consisting of toluol 100 grams, butyraldehyde 20 grams and ammonium sulfate 3.6 grams. After purification the residual alcohol groups calculated as vinyl alcohol were determined and found to be 28.2%. This result indicates that when butyraldehyde which is soluble in toluol is used as the reactive agent the reaction proceeds satisfactorily even without auxiliary liquids such as acetic acid.

Example No. 3

Two samples of polyvinyl alcohol sheeting 0.001 in. thick containing 17% dry basis of glycerine as plasticizer were wound on stainless steel screens, dried for one hour in an oven at 100° C. and then reacted in baths of the same composition, one for 2 hours at 73° C. and the other for 17 hours at room temperature. The composition of the baths was in each case:

|  | Grams |
|---|---|
| Toluol | 600 |
| Acetaic acid glacial | 300 |
| Paraformaldehyde | 30 |
| Ammonium sulfate | 18 |

At the end of the reaction the samples were purified and the number of residual alcohol groups determined. The sample reacted for 2 hours at 73° C. showed 15.2% alcohol groups calculated as vinyl alcohol while the sample reacted for 17 hours at room temperature showed 40.9% alcohol groups as vinyl alcohol.

These results show that the reaction takes place in shaped objects also, and that the rate of reaction is accelerated markedly by reacting at elevated temperatures.

Example No. 4

Powdered polyvinyl alcohol was screened through an 80 mesh sieve, oven dried overnight at 70° C. and 88 grams weighed out and added to a solution of 6.5 grams sulfuric acid in 100 grams methanol and mixed thoroughly, followed by air drying at 50° C. until the final weight was 102 grams. This quantity was charged to a mixture of 66 grams of paraldehyde in 500 grams mineral spirits and the temperature brought to 70° C. and maintained there for four hours. After standing overnight at room temperature the reaction product was washed, neutralized, purified, stabilized and dried. By analysis it showed 12.1% unreacted alcohol groups calculated as vinyl alcohol. It was a white powder completely insoluble in water, hot or cold.

Example No. 5

Powdered polyvinyl alcohol was screened, dried and treated with sulfuric acid and methanol as in Example No. 4 and 60 grams of this treated polyvinyl alcohol reacted with 65 grams crotonaldehyde in 300 grams mineral spirits at 70° C. for three hours. After purification, drying and analysis this reaction product was found to have 18.0% unreacted hydroxyl groups calculated as vinyl alcohol. The reaction product, a white powder, was totally insoluble in water, hot or cold.

Example No. 6

Powdered polyvinyl alcohol, acidified and dried was screened, as in Example No. 5, and 100 grams reacted with 150 grams furfuraldehyde in 500 grams mineral spirits at 70° C. for three hours. The reaction product, a dark brown powder, was insoluble in hot or cold water and showed by analysis 22.9% unreacted hydroxyl groups calculated as vinyl alcohol.

Example No. 7

Powdered polyvinyl alcohol was pretreated, as in Example No. 5, and 90 grams, thus treated, were reacted with 89 grams butyraldehyde in 500 grams mineral spirits. The reaction was started at 26° C. (room temperature). Without external heating the temperature rose to 40° C. and remained there for three hours. A sample purified and dried showed 7.7% unreacted alcohol groups calculated as vinyl alcohol. It was a white powder insoluble in water, hot or cold.

Example No. 8

Four samples of polyvinyl alcohol sheeting 0.003 inch thick were soaked for 30 minutes in a 5% solution of sulfuric acid in methanol and dried overnight at room temperature. Each of these four samples were placed in a bath containing 400 grams of n-heptane and 72 grams of butyraldehyde at 70° C. The four samples were reacted 2 minutes, 4 minutes, 7 minutes and 10 minutes and showed residual alcohol groups of 56%, 32%, 14% and 11%, respectively, calculated as vinyl alcohol.

Example No. 9

Four samples of polyvinyl alcohol sheeting 0.003 inch thick were soaked for 30 minutes in a 5% solution of sulfuric acid in methanol and dried overnight at room temperature. Each of these four samples were placed in a bath containing 400 grams of n-heptane and 70 grams of crotonaldehyde at 70° C. The four samples were reacted 2 minutes, 4 minutes, 7 minutes and 10 minutes and showed residual alcohol groups of 83%, 83%, 77% and 64%, respectively, calculated as vinyl alcohol.

I claim:

1. The process of water-insolubilizing a water soluble solid polyvinyl alcohol which comprises treating said solid alcohol with a solution of sulfuric acid and methanol, drying, and then heating it at a refluxing temperature in the presence of an acetalization catalyst and an aldehyde in a hydrocarbon which is liquid at normal temperature and pressure until the reaction product is insoluble in water, thereby producing a polyvinyl acetal which is not soluble in said hydrocarbon, the base material and the final product being in the solid state throughout the process.

2. The process of water-insolubilizing a water soluble solid polyvinyl alcohol which comprises treating said solid alcohol with a solution of sulfuric acid and methanol, drying, and then heating it at a refluxing temperature in the presence of an acetalization catalyst and an aldehyde in a paraffin which is liquid at normal temperature and pressure until the reaction product is insoluble in water, thereby producing a polyvinyl acetal which is not soluble in said paraffin, the base material and the final product being in the solid state throughout the process.

3. The process of water-insolubilizing a water soluble solid polyvinyl alcohol which comprises treating said solid alcohol with a solution of sulfuric acid and methanol, drying, and then heating it at a refluxing temperature in the presence of an acetalization catalyst and an aldehyde in an aromatic liquid hydrocarbon until the reaction product is insoluble in water, thereby producing a polyvinyl acetal which is not soluble in said hydrocarbon, the base material and the final product being in the solid state throughout the process.

4. The process of water-insolubilizing a water soluble solid polyvinyl alcohol which comprises treating said solid alcohol with a solution of sulfuric acid and methanol, drying, and then heating it at a refluxing temperature in the presence of an acetalization catalyst and an aldehyde in n-heptane until the reaction product is insoluble in water, thereby producing a polyvinyl acetal which is not soluble in said n-heptane, the base material and the final product being in the solid state throughout the process.

5. The process of water-insolubilizing a water soluble solid polyvinyl alcohol which comprises treating said solid alcohol with a solution of sulfuric acid and methanol, drying, and then heating it at a refluxing temperature in the presence of an acetalization catalyst and an aldehyde in toluol until the reaction product is insoluble in water, thereby producing a polyvinyl acetal which is not soluble in said toluol, the base material and the final product being in the solid state throughout the process.

6. The process of water insolubilizing a water soluble solid polyvinyl alcohol which comprises treating said solid alcohol with a solution of sulfuric acid and methanol, drying, and then heating it at a refluxing temperature in the presence of an acetalization catalyst in a bath of toluol and acetic acid containing paraformaldehyde until the reaction product is insoluble in water, thereby producing a polyvinyl acetal which is not soluble in said bath, the base material and the final product being in the solid state throughout the process.

JOSEPH DAHLE.